(12) United States Patent
Konno et al.

(10) Patent No.: US 6,341,693 B2
(45) Date of Patent: Jan. 29, 2002

(54) STORAGE CASE

(75) Inventors: Toshikazu Konno; Chika Nakata, both of Miyagi; Masahiro Kinoshita; Makoto Yamaguchi, both of Aichi, all of (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/735,458

(22) Filed: Dec. 14, 2000

(30) Foreign Application Priority Data

Dec. 17, 1999 (JP) .......................................... 11-359717
Jun. 27, 2000 (JP) ...................................... 2000-193005

(51) Int. Cl.⁷ ............................................. B65D 85/48
(52) U.S. Cl. ...................... 206/449; 206/38.1; 206/39
(58) Field of Search ........................ 206/38.1, 449, 206/454, 1.5, 39, 38; 220/345.1, 345.2, 345.3, 351; 312/9.48

(56) References Cited

U.S. PATENT DOCUMENTS

| | | | |
|---|---|---|---|
| 1,997,043 A | | 4/1935 | Clark |
| 3,887,106 A | * | 6/1975 | Charlson et al. ............... 206/39 |
| 3,888,350 A | * | 6/1975 | Horvath ....................... 206/540 |
| 4,779,730 A | * | 10/1988 | Hartsfield et al. ........ 206/387.1 |
| 4,838,422 A | * | 6/1989 | Gregerson ............... 206/387.1 |
| 5,020,255 A | | 6/1991 | Rodel |
| 5,038,932 A | * | 8/1991 | Sheu ........................ 206/387.1 |
| 5,353,947 A | * | 10/1994 | Zinnbaner et al. .......... 206/581 |
| 5,427,446 A | * | 6/1995 | Glomski ..................... 312/242 |
| 5,732,820 A | * | 3/1998 | Tsai ............................ 206/369 |
| 5,878,887 A | * | 3/1999 | Parker et al. ................ 206/528 |
| 5,950,816 A | * | 9/1999 | Reid ......................... 206/38.1 |

FOREIGN PATENT DOCUMENTS

WO            9101096 A            2/1997

\* cited by examiner

*Primary Examiner*—Shian Luong
(74) *Attorney, Agent, or Firm*—Rader, Fishman & Grauer PLLC; Ronald P. Kananen, Esq.

(57) ABSTRACT

A storage case has a base half and a slide half, the slide half moveably attached to the base half. The slide half can move along in continuous contact with the base half. A lid is integrally formed with the slide half, and opens and closes an opening in the slide half for the insertion or removal of objects. When the slide half is slid along in continuous contact with the base half, protrusions on the lid move along in continuous contact with cam grooves on the base half to permit the lid to open and close. The storage case can store a memory card, and protect the card from being smudged, dirtied or damaged from impact.

9 Claims, 7 Drawing Sheets

STORAGE CASE

BACKGROUND OF THE INVENTION

1. Field of the Invention

The present invention relates to a storage case for use in enclosing memory cards, for example.

2. Brief Description of the Related Art

In recent years, memory cards are widely used as mass-storage recording mediums for storing data from electronic devices such as personal computers and digital cameras.

While a terminal portion of a memory card is being exposed, terminals at the terminal portion are unavoidably smudged by dusts, or the like and data cannot accurately be written in and read out from the memory card. Accordingly, the memory card is generally enclosed in its own case and protected from dusts.

A conventional storage case for a memory card is shaped like a bag formed of two stacked polyethylene sheets joined by heat sealing and is therefore generally simple in structure.

Such a conventional storage case cannot protect the enclosed memory card from being smudged by dusts which are easily entered from its opening portion. This opening portion of the storage case brings a risk that the memory card will be dropped from the opening portion unintentionally while a user is carrying the storage case.

To overcome the above shortcomings, there is proposed some storage case having a lid to open and close its opening portion to protect an enclosed object from dusts. Such proposed storage case is difficult to handle because it takes a lot of time and labor for users to open and close the lid.

SUMMARY OF THE INVENTION

In view of the aforesaid aspect, it is an object of the present invention to provide a storage case in which an enclosed object can reliably be prevented from being smudged by dusts and the enclosed object can also reliably be prevented from being dropped unintentionally and which is easy to handle.

To solve the above-mentioned problem, a storage case according to the present invention comprises:

a base half, a slide half slidablly combined with the base half lid provided integrally with the slide half to open and close an opening portion for admitting or ejecting an enclosed object, wherein there is provided a structure in which cam grooves provided on either side of the base half and the lid are engaged with protrusions on the other side, and when the slide half is subjected to slide operation relative to the base half, the protrusions move along in continuous contact with the cam grooves to thereby open and close the lid.

With the storage case constituted in such a fashion according to the present invention, since the opening portion is firmly closed by the lid while the enclosed object is being enclosed in the storage case, the storage case can surely be prevented from being smudged by dusts and the enclosed object in the storage case can reliably be prevented from being dropped unintentionally.

In this storage case, since the lid opens and closes as the slide half is slid, a user can easily get the enclosed object in and out of the storage case by only sliding the slide half, and hence the storage case is considerably easy to handle.

DESCRIPTION OF THE PREFERRED EMBODIMENTS

A preferred embodiment according to the present invention will be described below in detail with reference to the drawings.

Figure 1:
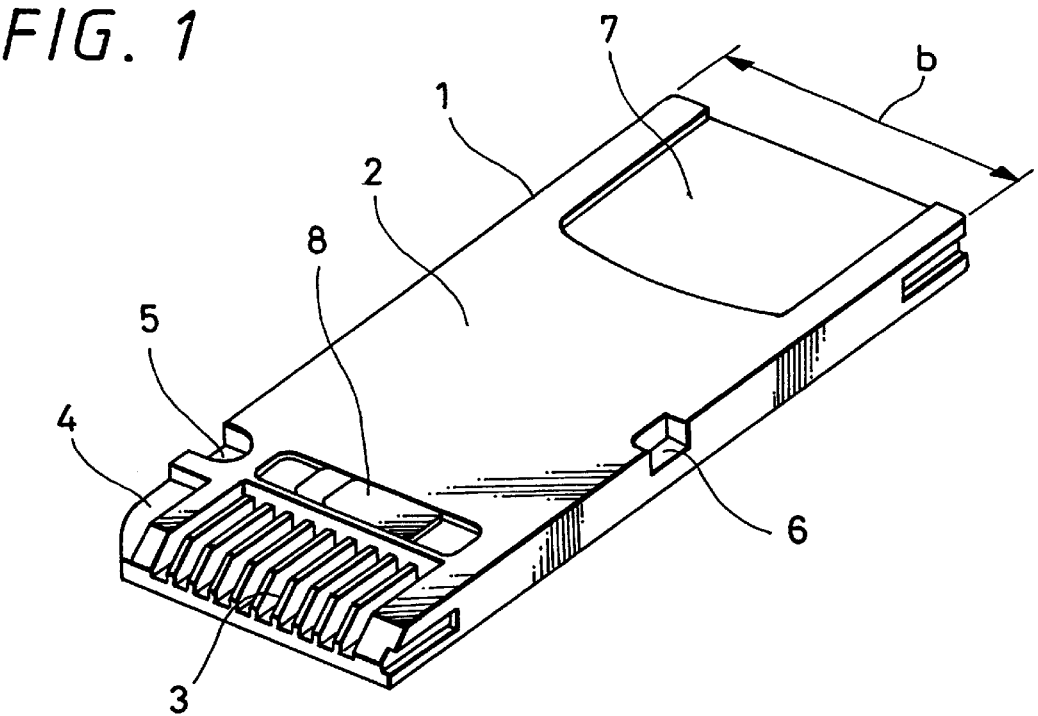
FIG. 1 is a perspective view of a memory card.
Figure 2:
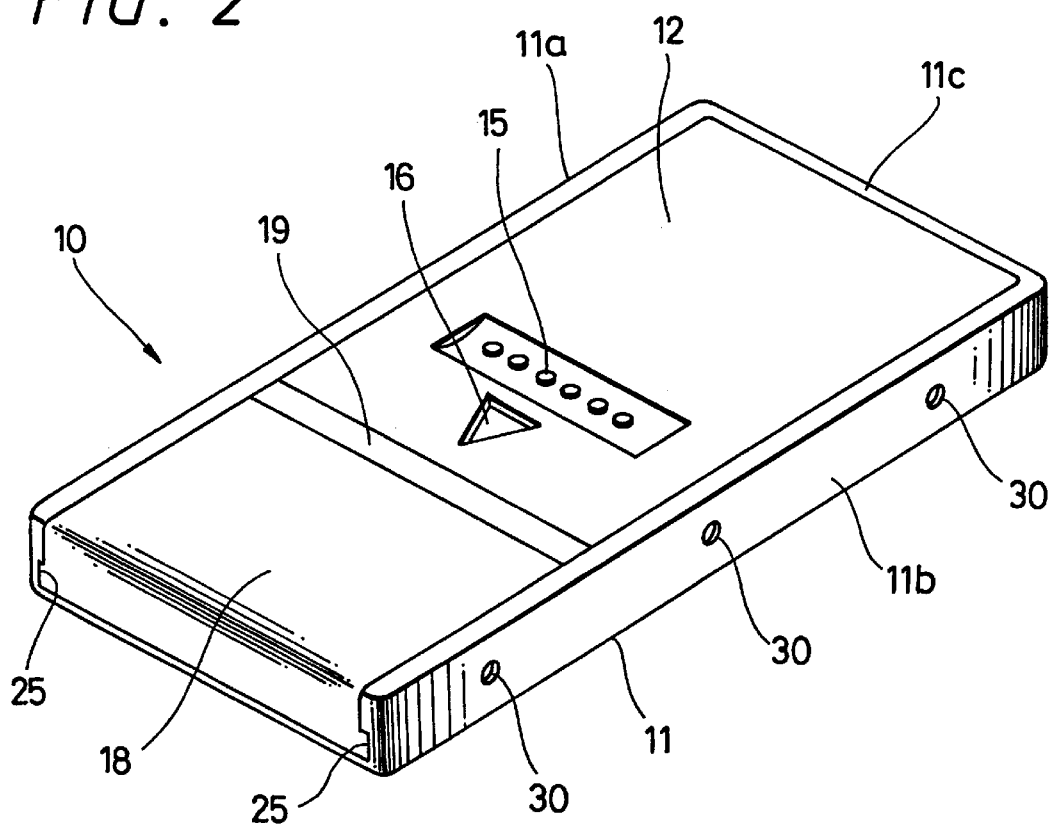
FIG. 2 is a perspective view of a storage case according to the present invention.
Figure 3:
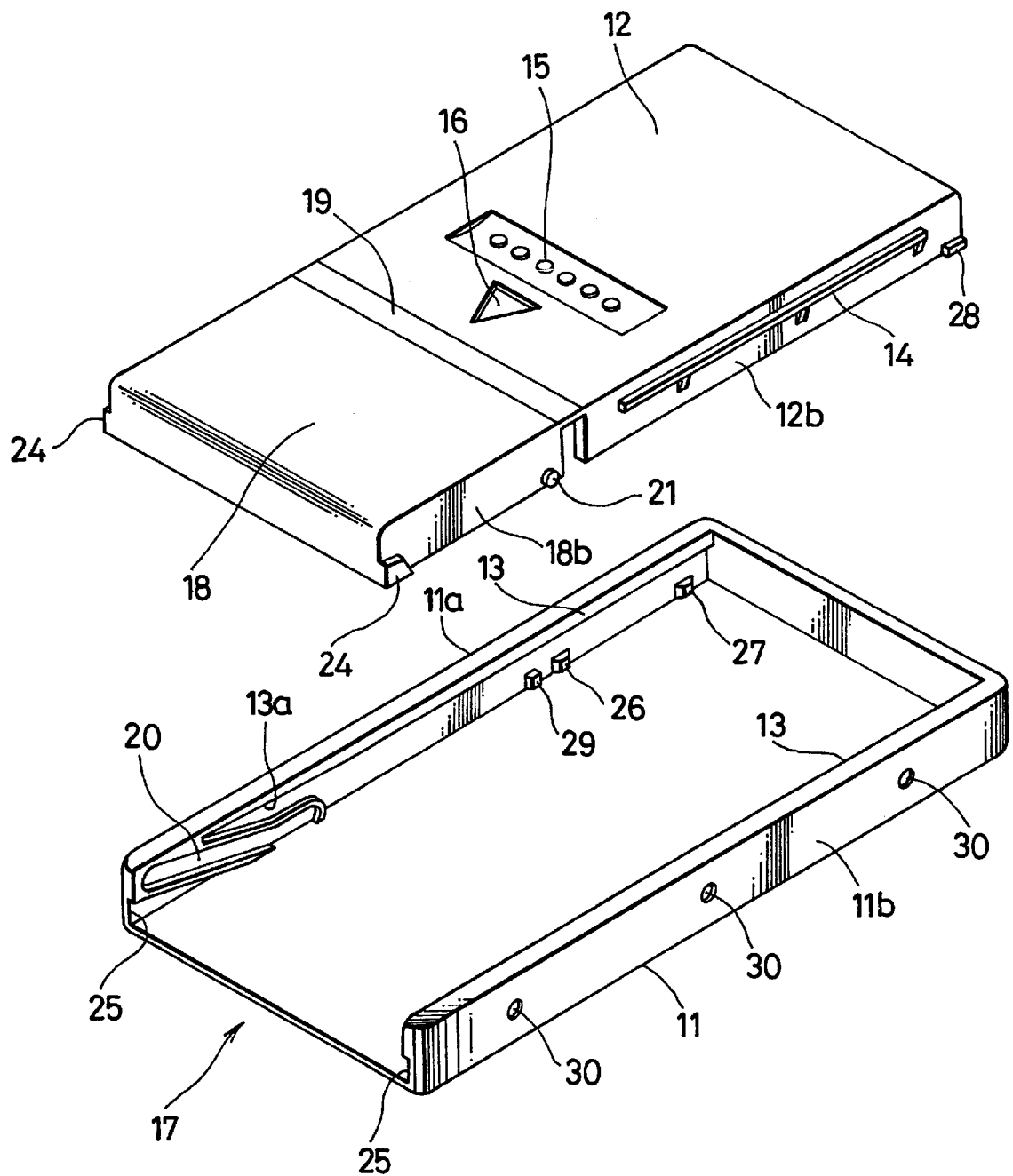
FIG. 3 is an exploded perspective view of a storage case according to the present invention.
Figure 4:
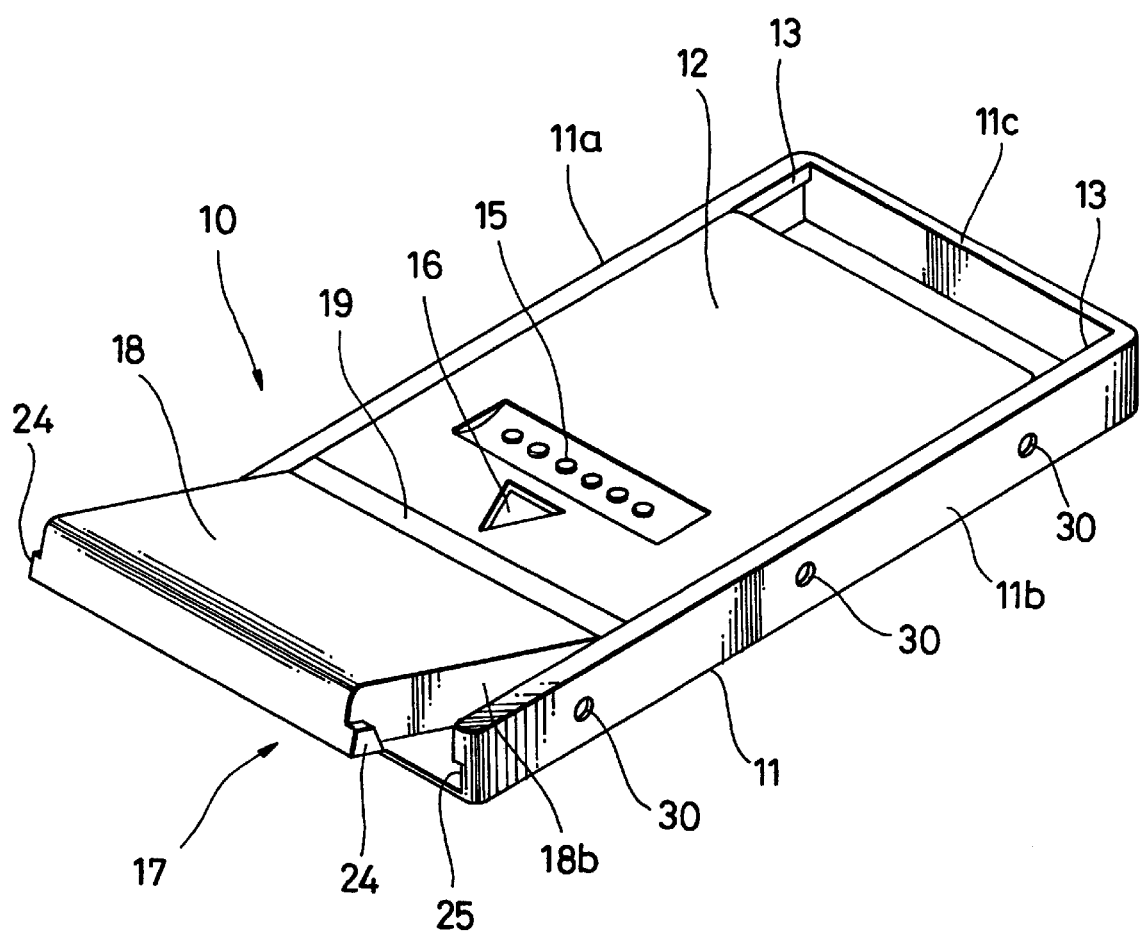
FIG. 4 is a perspective view of a storage case according to the present invention with its lid being opened.

In this embodiment, a storage case for enclosing a memory card shown in FIG. 1 will be described.

A memory card 1 is a mass-storage capacity recording medium called a memory stick, and has a rectangular thin plate-like body 2 in which a memory of several megabytes to Several 10s of megabytes is incorporated.

The memory card 1 has a terminal portion 3 provided at one end of the body 2. While the memory card 1 is being inserted into a card slot of an electronic device such as a personal computer and a digital camera, the terminal portion 3 is connected to terminals of the electronic device to write data or read out data in or from the memory card.

Reference numerals 4, 5, 6 denotes positioning recesses, reference numeral 7 denotes a label attachment area and reference numeral 8 denotes a mis-erase preventing switch.

FIGS. 2 to 9 show the structure of the inventive storage case for enclosing the memory card 1.

As illustrated, as a whole a storage case 10 is shaped like a rectangular thin box and formed by joining a base half 11 and a slide half 12 which can slide along the longitudinal direction of the base half 11, each of the base half and the slide half being made of a highly-rigid resin material. The above memory card 1 is enclosed as an enclosed object within a space between the base half and the slide half.

Figure 6:
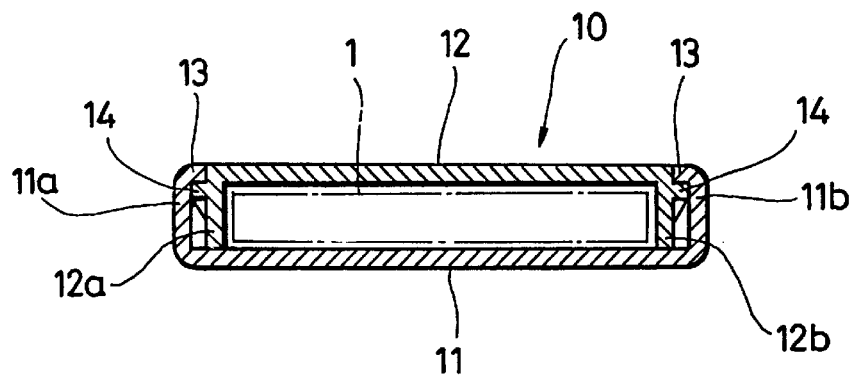
FIG. 6 is a longitudinal cross-sectional view of a storage case according to the present invention.

This storage case 10 is arranged such that the slide half 12 is joined to the base half 11 so as to become slidable. As shown in FIG. 6, slide rail portions 14 protruded on the outer side surfaces of two side plate portions 12a, 12b of the slide half 12 are engaged with protruded rail portions 13 protruded on the inside upper ends of the two side plate portions 11a, 11b of the base half 11, whereby the joined state of the base half 11 and the slide half 12 can be retained.

On its upper surface portion, the slide half 12 has a plurality of small protrusions 15 to prevent user's fingers from slipping when a user moves the slide half 12 with fingers, as will be described later on, and a triangle mark 16 indicating the direction in which a user should move the slide half.

On its front portion, the slide half 12 has a lid 18 to open and close an opening portion 17 which admits or ejects the memory card as the enclosed object.

The lid 18 is integrally formed with the front of the slide half 12 and swings in the upper and lower direction with a thin hinge portion 19 being as a fulcrum to open and close the opening portion 17 at the front of the storage case.

In this storage case 10, as for the material of the base half 11 a relatively hard resin material such as PC, ABS or GPS is used whereas a relatively soft and highly-durable resin material such as PP and the like is chosen for the slide half 12 because it has the such structure in which to have the above-mentioned hinge portion.

The storage case 10 uses a mechanism by which the lid 18 can open and close as the slide half 12 slides.

The mechanism for opening and closing the lid 18 will be described in detail. According to this embodiment, on the front of the base half 11, cam grooves 20 are formed on the inner side walls of the both sides plate portions 11a, 11b. On the outer side walls of both sides plate portions 18a, 18b of the lid 18, pin-like protrusions 21 are protruded at the position near the hinge portion 19. Those protrusions 21 are being engaged with the above-mentioned cam grooves 20.

The cam grooves 20 are shaped as inclined grooves with an inclination angle which progressively decreases in the rear and increases in the front. While a user is moving the slide half 12 along in the continuous contact with the base half 11, the protrusions 21 move along in the continuous contact with the cam grooves 20 to permit the lid 18 to open and close about the hinge portion 19.

Figure 7A:
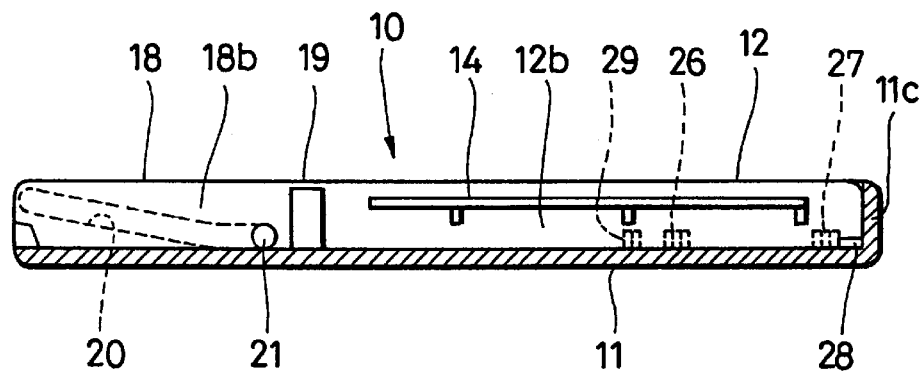
FIG. 7 is a cross-sectional side view of a base half, wherein (A) shows the storage case with its lid being closed and (B) shows the storage case with its lid being opened.

Specifically, as shown in FIG. 7(A), when the slide half 12 is located at the rearmost position in which it is brought in contact with a rear side plate portion 11c of the base half 11, the lid 8 is being closed. In this state, the protrusions 21 are engaged with the cam grooves 20 at their low positions of the rearmost end.

Figure 7B:
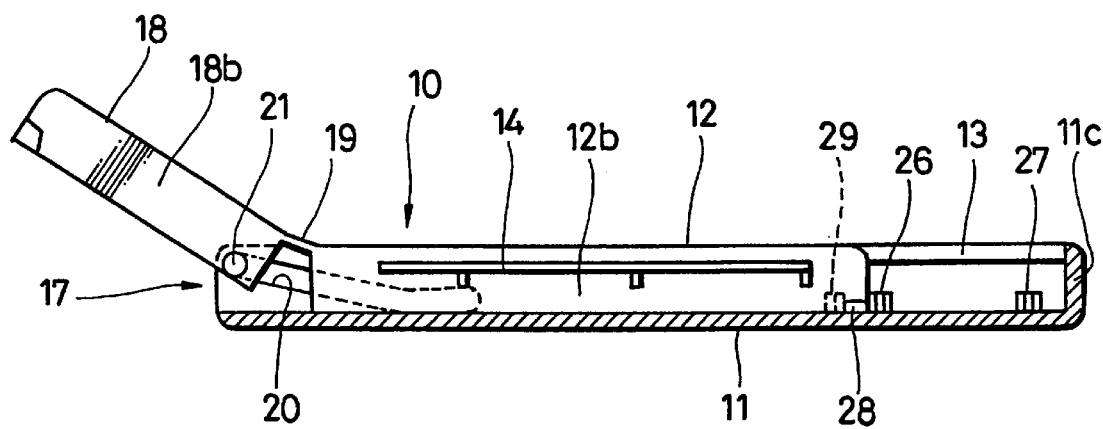

While a user slides the slide half 12 along the base half 11 forward as shown in FIG. 7(B), the lid 18 also moves in unison with the slide half 2 and protrusions 21 slide along the inclinations of the cam grooves to the forward high position to enable the lid 18 to rotate about the hinge portion 19 to open. Hence, the opening portion 17 at the front of the storage case opens to enable a user to get the memory card in and out of the storage case.

When the user slides the slide half 12 rearward from this state, the lid 18 is closed according to the reverse operation.

With the above arrangement of the storage case 10 according to this embodiment, while the opening portion 17 is firmly closed by the lid 18 under the state that the memory card 1 is enclosed in the storage case as the enclosed object, the memory card can reliably be prevented from being smudged by dusts and also can reliably be prevented from being dropped unintentionally.

Since the storage case 10 is molded by a highly-rigid resin material and hence can reliably protect the memory card 1, which is the enclosed object, from pressure applied from the outside and is excellent in durability.

In the storage case 10, the lid 18 opens and closes as the user slides the slide base 12, and hence the user can easily get the memory card in and out of the storage case.

Figure 10:
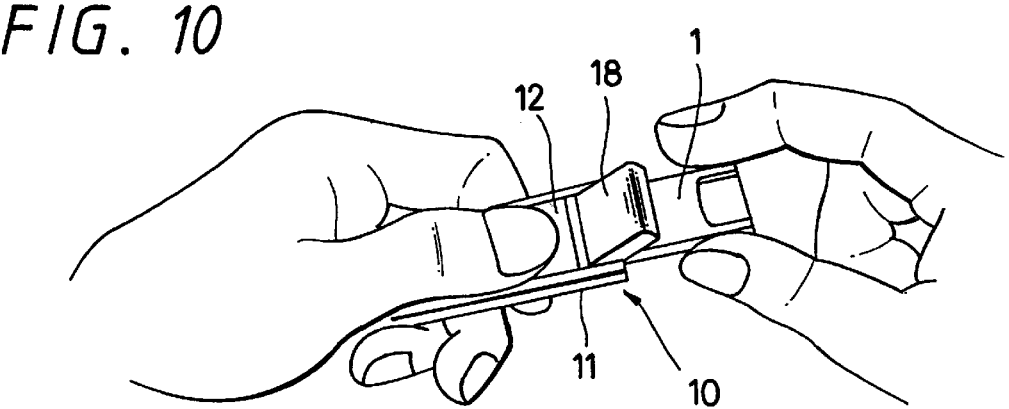
FIG. 10 is a diagram showing the manner in which a user gets a memory card in and out of a storage case.

The manner in which the user gets the memory card in and out of the storage case will be described with reference to FIG. 10.

Specifically, as illustrated, while the user is holding the storage case 10 according to this embodiment with one hand, the user can slide the slide half 12 to open the lid 18 with a thumb and get the memory card 1 in and out of the storage case with the other hand. Therefore, the storage case is considerably easy to handle.

In the storage case with the above arrangement, when the user slides the slide half 12 in the direction in which the lid 18 opens, the front of the slide half 12 is urged to be raised with application of force as the lid 18 is opening upward. As a consequence, contact pressure at the engagement portion between the slide rail portions 14 of the slide half 12 and the protruded rail portions 13 of the base half 11 increases so that frictional resistance increases. As a result, the slide half 12 becomes difficult to slide smoothly and hence cannot slide smoothly.

Figure 8A:
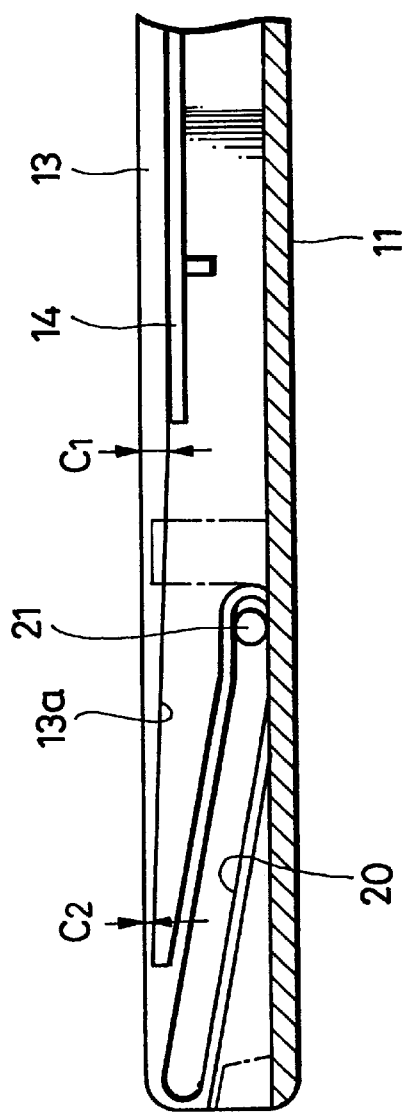
FIG. 8 is a cross-sectional side view of a base half to which reference will be made in explaining a structure of a protruded rail portion of the base half, wherein (A) shows the storage case with its lid being closed and (B) shows the storage case with its lid being opened.

To solve this problem, in particular, in the storage case 10 according to this embodiment, as shown in FIG. 8(A), there is employed a structure such that the protruded rail portion 13 of the base half 11 has a slope 13a formed at the engagement surface between it and the slide rail portion 14 of the slide body 12.

This slope 13a is a straight-line inclined slope formed such that the thickness of the protruded rail portion 13 becomes gradually thin toward the front, e.g. the opening portion from the starting point of the position substantially corresponding to the leading front end portion of the slide rail portion 14 of the slide half 12 obtained when the lid 18 is placed in the closed state ($c1 > c2$). An angle of this slope falls within a range of from approximately 1.5 to 2.0.

The slope 13a is not limited to the illustrated straight-line slope with inclination and may be formed as a curve-like slope.

Figure 8B:
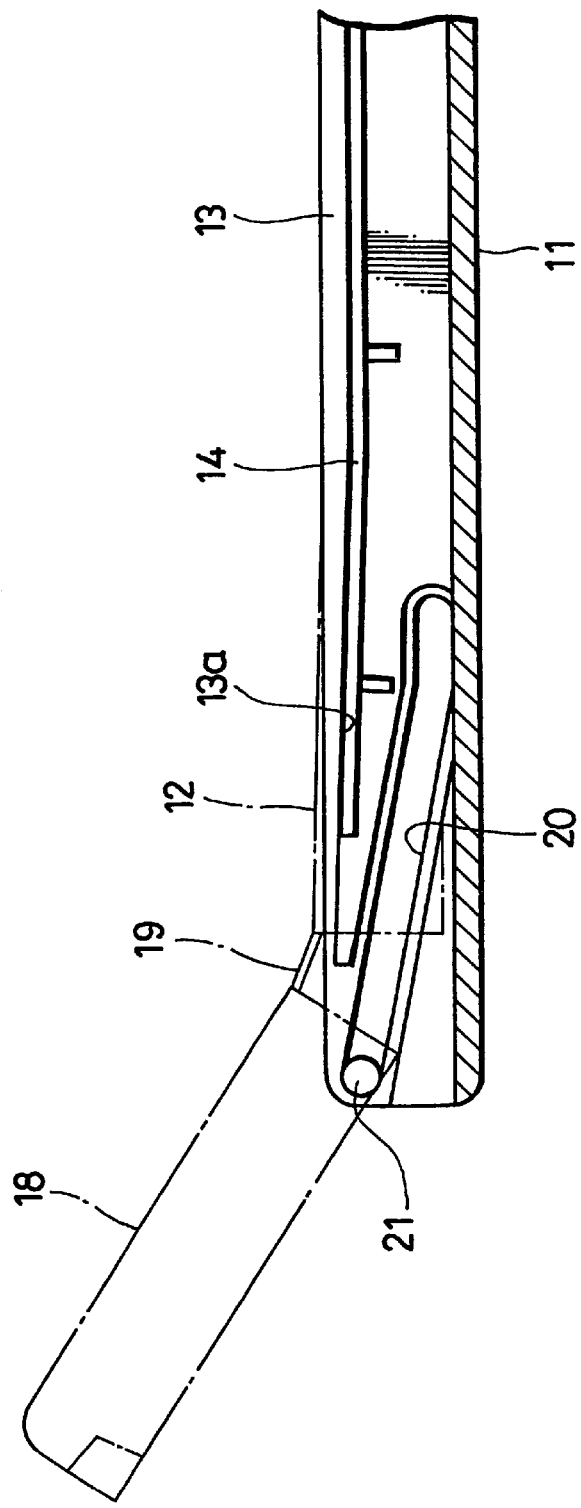
Figure 9:
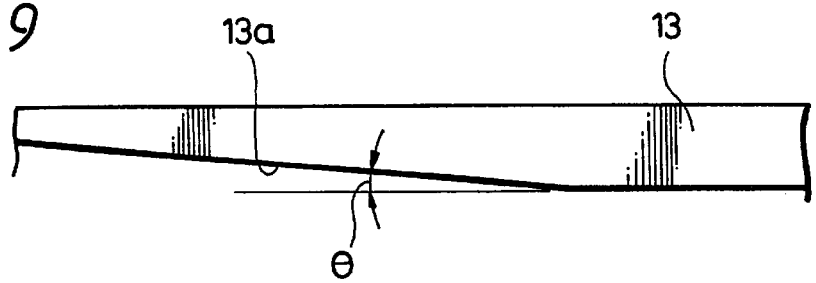
FIG. 9 is a diagram to which reference will be made in explaining an angle of a slope.

With the above structure, in the storage case 10 according to this embodiment, while the user is sliding the slide half 12 in the direction in which the lid 18 opens, even when the front of the slide half 12 is urged to be raised as the lid 18 progressively opens upward as shown in FIG. 8(B), the slide rail portion 14 of the slide half 12 moves along in the continuous contact with the slope 13a of the protruded rail portion 13 of the base half 11 so that contact pressure between the slide rail portion 14 of the slide half 12 and the protruded rail portion 13 of the base half 11 can be prevented from increasing. Consequently, the slide half 12 can be prevented from becoming difficult to move smoothly and hence the movement of the slide half 12 can be made smooth.

Besides the above arrangement, in the storage case 10 according to this embodiment, when the memory card 1, which is the enclosed object, is enclosed in the storage case, the memory card is retained in the slide half 12 with pressure.

Figure 5A:
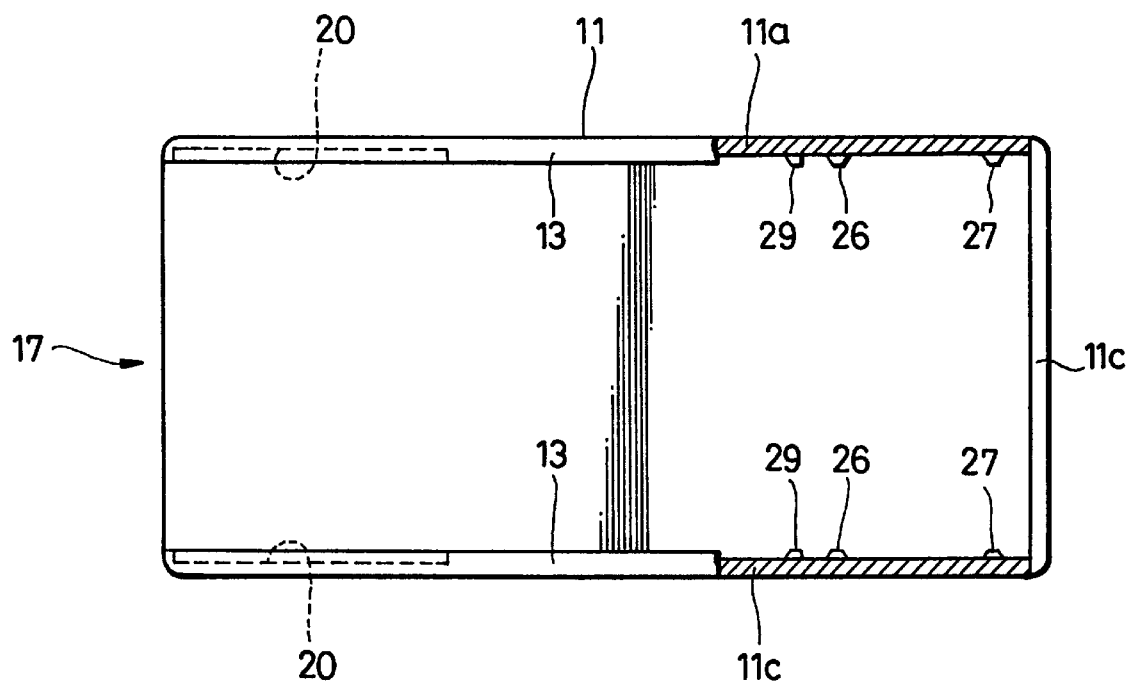
FIG. 5 is a partly cutaway plan view of a storage case according to the present invention, wherein (A) shows a base half and (B) shows a slide half.
Figure 5B:
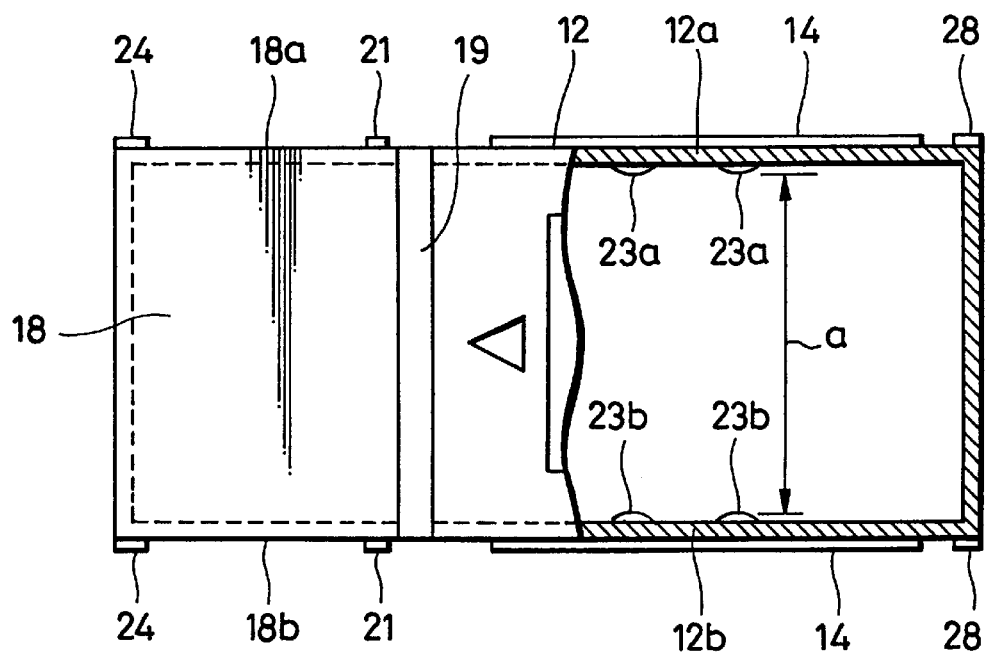

Specifically, in the inside of the storage case 10, as shown in FIG. 5(B), two sets of opposing arcuate protrusions 23, 26b are disposed on the inner side walls of the respective side plates 12a, 12b of the slide half 12 in parallel to each other. A size between the protrusions 23a and 23b on both sides (inside size) a is slightly smaller than a width b of the memory card 1 shown in FIG. 1 (in the size in actual practice, the size a between the protrusions 23a and 23b on both sides falls within a range of from 21.2 to 21.3 mm and slightly overlaps the width b of the memory card 1 within 21.45 (0.05 mm from a size standpoint).

Consequently, when the memory card 1 is inserted into the storage case, while the protrusions 23a and 23b are pressing against the respective sides of the memory card, the memory card is inserted into the slide half 12 with pressure and retained in that state.

In the storage case 10 according to this embodiment, since the memory card 1, which is the enclosed object, is inserted into the slide half 12 with pressure and retained therein, whatever direction a user inserts the memory card 1 into the slide half (the user inserts the memory card into the slide half with the terminal portion 3 toward the user, the user inserts the memory card into the slide half in the direction opposite to the above direction and the user inserts the memory card into the slide half inside out), the memory card can be retained in the slide half 12 firmly.

Consequently, when the user slides the slide half 12, the memory card also moves in unison with the slide half so that the user can get the memory card in and out of the storage case smoothly.

Specifically, when the user gets the memory card in the storage case, while the user is inserting the memory card into the storage case, the user should slide the slide half 12 in the direction in which the lid 18 closes so that the memory card can be moved in unison with the slide half 12 and smoothly enclosed in the storage case.

When the user gets the memory card out of the storage case, the user should slide the slide half 12 in the direction in which the lid 18 opens so that the memory card can be moved in unison with the slide half 12 and ejected from the opening portion 17. Hence, the user can smoothly get the memory card out of the storage case.

In this manner, in the storage case 10 according to this embodiment, since the memory card is moved as the slide half 12 slides, the user can smoothly get the memory card in and out of the storage case, and hence the storage case becomes easier to handle.

Further, in the storage case 10 according to this embodiment, while the lid 18 is being opened, even when the user turns the opening portion 17 downward or lightly shakes the storage case in this state, the memory card is difficult to be dropped because the memory card is inserted into the slide half 12 with pressure and thereby firmly retained therein.

Therefore, the memory card can reliably be prevented from being lost. Memory cards are costly and are as expensive as thousands of yen to tens of thousands of yen, and hence the above effect for preventing memory cards from being lost is considerably effective.

Furthermore, in the storage case 10 according to this embodiment, when the lid 18 is closed, the lid 8 is locked in its closed state.

Specifically, on the front end of the lid 18, the engagement protruded portions 24 are formed on the two side plate portions 18a, 18b. When the lid 18 closes, the engagement protruded portions 24 are engaged with the recess-like portions 25 formed on the front end (both sides of the opening portion 17) of the two side plate portions 11a, 11b of the base half 11.

As a consequence, since the lid 18 is locked so that its front end can be prevented from being raised, there is no risk that the lid 18 will be opened by other force than operating force. Therefore, the memory card can reliably be protected.

Further, the storage case 10 according to this embodiment includes a click mechanism to cause it to click when the movement of the slide half 12 is brought to an end while the user is sliding the slide half 12.

To be more concrete, on its inner side walls of the two side plate portions 11a, 11b, the base half 11 has click protrusions 26 and 27 formed with a predetermined space before and behind. When the user slides the slide half 12, protruded portions 28 formed on the rear ends of the two side plate portions 12a, 12b of the slide half 12 pass over the click protrusions 26, 27 to cause the storage case to click.

Specifically, when the user slides the slide half 12 in the direction in which the lid 18 opens, just before the lid 18 opens fully, the protruded portions 28 pass over the preceding click protrusions 26 to cause the storage case to click. Conversely, when the user slides the slide half 12 in the direction in which the lid 18 closes, immediately before the slide half 12 comes in contact with the rear side plate portions 11c of the base half 11, the protruded portions 28 pass over the succeeding click protrusions 27 to cause the storage case to click.

As described above, the storage case according to this embodiment can click when the movement of the slide half 12 is brought to an end, and hence this storage case is very comfortable for the user.

In particular, when the slide half is slid in the direction in which the lid 18 opens, immediately before the lid 18 opens completely, the storage case can click and hence the user can definitely recognize when the movement of the slide half is brought to an end. Therefore, it becomes possible to effectively avoid an accident such as when the storage case is broken after the user has moved the slide half along in continuous contact with the base half excessively until the protrusions 21 of the lid 18 are disengaged from the cam grooves 20.

On its inner side walls of the two side plate portions 11a, 11b, the base half 11 has stopper protrusions 29 located ahead of the click protrusions 26. When the lid 18 opens completely, the protruded portions 28 abut against the stopper protrusions 29 to engage the slide half 12 with the base half so as not to move farther forward.

Further, in the storage case 10 according to this embodiment, on its outer side walls of the two side plate portions 11a, 11b, the base half 11 has a plurality of engagement concave holes 30 disposed in parallel to each other in the longitudinal direction.

Figure 11:
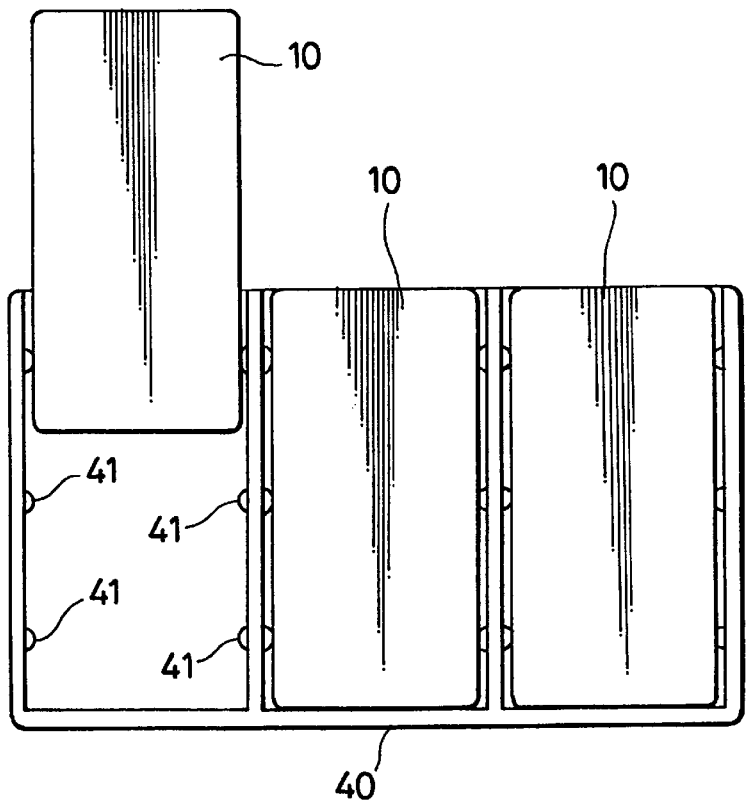
FIG. 11 is a plan view illustrating another case for enclosing the storage case according to the present invention.

Those engagement concave holes are used to enclose the storage case according to this embodiment in another case. FIG. 11 shows an example of another case.

Specifically, a case 40 is a card-size case to enclose a plurality of storage cases 10 according to this embodiment in parallel. While the storage case 10 according to this embodiment is being enclosed in this case 40, the engagement concave holes 30 of the storage case 10 according to this embodiment engage with convex portions 41 projected on two inner side walls of its compartment and hence the storage case of this embodiment can be retained in the fixed state.

When a plurality of storage cases 10 according to this embodiment are enclosed together in the card-size case 40, the storage case according to this embodiment becomes more convenient to carry.

While the embodiment of the present invention has been described so far, the present invention is not limited to the above embodiment.

For example, while the cam grooves 20 are formed on the base half 11 and the protrusions 21 are formed on the lid 18 as the mechanism for opening and closing the lid 18 in the above embodiment, the present invention is not limited thereto, stated otherwise, the cam grooves 20 may be formed on the lid 18 and the protrusions 21 may be formed on the base half 11.

The storage case according to the present invention is not limited to the storage case for use in enclosing the memory card and can be widely applied to storage cases for use in enclosing all sorts of products.

As described above, in the storage case according to the present invention, while the enclosed object is being enclosed in the storage case, since the opening portion is firmly closed by the lid, the storage case can reliably be prevented from being smudged by dusts and the enclosed object can reliably be prevented from being dropped unintentionally.

According to this storage case, since the user can open the lid by only sliding the slide half and can easily get the enclosed object in and out of the storage case, the storage case is considerably easy to handle.

According to this storage case, in its protruded portions on the insides of the two side plate portions of the base half which retains the slide base in the joined state, the engagement surface between the base half and the slide half includes a slope formed such that the thickness of the protruded portion progressively decreases in the opening portion. Consequently, when the user slides the slide half in the direction in which the lid opens, the slide half can be prevented from becoming difficult to move smoothly and hence the slide half can slide smoothly.

According to this storage case, since the enclosed object is inserted into the slide half with pressure and retained therein, regardless of the direction in which the user inserts the enclosed object into the storage case, the enclosed object can be firmly retained in the slide half. Moreover, since the enclosed object also is moved as the slide half is slid, the user can smoothly get the enclosed object in and out of the storage case.

Further, while the lid is being opened, the enclosed object can be inserted into the slide half with pressure and firmly retained therein, and hence the enclosed object is difficult to drop unintentionally.

According to this storage case, since the lid is engaged with a part of the base half and thereby locked when the lid is closed, the lid can be prevented from being opened by force, and hence the enclosed object can reliably be protected.

Further, according to this storage case, since the storage case can click when the movement of the slide half is brought to an end, the storage case becomes comfortable for the user. Furthermore, since the storage case can click, it becomes possible to prevent the user from moving the slide half excessively. There is then the effect that the storage case can be prevented from being broken.

Furthermore, since this storage case includes the engagement portions engaged with another case to retain another case in the fixed state when this storage case is enclosed in another case, when the user encloses a plurality of storage cases together in another case and carries the storage case, this storage case becomes convenient.

When the storage case according to the present invention with the above various characteristics are made commercially available on the market as accessories of products, it is possible to increase value of a product much more.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A storage case comprising:
   a base half;
   a slide half joined to said base half so as to move along in continuous contact with said base half;
   lid integrally formed with said slide half to open and close an opening portion for admitting or ejecting an enclosed object, wherein cam grooves on any one of said base half and said lid are engaged with protrusions on a corresponding one of said base half and said lid, while said slide half is sliding on said base half, said protrusions move along in continuous contact with said cam grooves to thereby open and close said lid; and
   protruded rail portions on the insides of two side plate portions, in said protruded rail portions, that engagement surface with said slide half having an inclination such that the thickness of said protruded rail portion progressively decreases in said opening portion.

2. A storage case according to claim 1, further comprising an engagement portion formed at a first longitudinal end of said lid and wherein when said lid is closed, said engagement portion engages with a part of said base half to lock said lid.

3. A storage case according to claim 1, further comprising a click mechanism to cause said storage case to click when the movement of said slide half is brought to an end.

4. A storage case according to claim 1, further comprising an engagement portion engaged with another case to retain said storage case in a fixed state when said storage case is enclosed in said another case.

5. A storage case comprising:
   a base having a bottom wall and a plurality of side walls, said base having at least one side-wall opening and forming an open top container, at least one side wall further comprising a cam groove and a protruded rail portion facing the inside of the container, the protruded rail portion having an engagement surface with an inclination whereby protruded rail portion thickness progressively increases or decreases along a longitudinal direction;
   a top that slidably engages said base and said protruded rail portion to form a closed container compartment; and
   a lid portion integrally formed with said top that has an open position allowing a user access to the container compartment and a closed position that prevent access to the container compartment, said lid portion having an axially protruding pin that engages the cam groove.

6. The storage case of claim 5, wherein said top further comprises at least two generally opposing arcuate protrusions separated by a first distance that retain an object sized to fit within the storage case, the object having a width larger that the first distance for retention between the at least two protrusions.

7. The storage case of claim 5, said lid portion further comprising at least one lid engagement portion that engages a base engaging portion when the lid is in the closed position.

8. The storage case of claim 5, further comprising a click mechanism that generates a click noise when the top portion is slidably engaged with the bottom portion.

9. The storage case of claim 5, wherein the storage case further comprises a first engagement recess on a first side of said storage case and a second engagement recess on a second side of said storage case, said first slide on an opposite side of said first side of said storage case, wherein the storage case is retained in a storage case container when engagement pins protruding from the storage case container engages the engagement recesses of the storage case.

* * * * *

UNITED STATES PATENT AND TRADEMARK OFFICE
CERTIFICATE OF CORRECTION

PATENT NO. : 6,341,693 B2
DATED : January 29, 2002
INVENTOR(S) : Toshikazu Konno It is certified that error appears in the above-identified patent and that said Letters Patent is hereby corrected as shown below:

<u>Column 8,</u>
Line 13, before "lid" insert -- a --.

Signed and Sealed this

Fourth Day of February, 2003

JAMES E. ROGAN
*Director of the United States Patent and Trademark Office*